United States Patent
Onishi

(10) Patent No.: US 6,864,343 B2
(45) Date of Patent: Mar. 8, 2005

(54) BROMINATED POLYPHENYLENE OXIDE AND FLAME RETARDANT EMPLOYING THE BROMINATED POLYPHENYLENE OXIDE

(75) Inventor: Hideaki Onishi, Otsu (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 10/457,261

(22) Filed: Jun. 9, 2003

(65) Prior Publication Data

US 2004/0039149 A1 Feb. 26, 2004

(30) Foreign Application Priority Data

Aug. 20, 2002 (JP) ........................................ 2002-239664

(51) Int. Cl.[7] ............................................... C08G 65/80
(52) U.S. Cl. ......................... 528/86; 528/397; 528/499; 528/501; 528/502 A; 528/502 R; 528/502 C
(58) Field of Search .......................... 528/86, 397, 499, 528/502 R, 502 C, 501, 502 A

(56) References Cited

U.S. PATENT DOCUMENTS

| | | |
|---|---|---|
| 4,141,880 A | 2/1979 | Nametz et al. |
| 4,280,952 A | 7/1981 | Nametz et al. |
| 4,341,890 A | 7/1982 | Lindvay |
| 4,353,820 A | 10/1982 | Lindvay |
| 4,567,242 A | 1/1986 | Nishibori et al. |

FOREIGN PATENT DOCUMENTS

| | | |
|---|---|---|
| EP | 0 149 190 | 7/1985 |
| EP | 0 288 269 | 10/1988 |
| GB | 2 014 165 | 8/1979 |
| GB | 2 023 616 | 1/1980 |

OTHER PUBLICATIONS

Jul. 1, 1980 Flame Retardants: Signs of a 'Thaw' in R&D Agostino von Hassell Plastics Technology vol. 26, No. 8 pp. 71–74.

*Primary Examiner*—Duc Truong
(74) *Attorney, Agent, or Firm*—Jordan and Hamburg LLP

(57) ABSTRACT

A brominated polyphenylene oxide having a molecular skeleton obtained by condensing tribromophenols and satisfying the requirements: (A) its 20 wt. % solution in chloroform has an absorbance at 600 nm of not larger than 0.6; (B) when 50 ml of ion-exchanged water is added to its 1.00 g/30 ml solution in dioxane, the resulting solution has an electroconductivity of not larger than 10 $\mu$S/cm measured at 25° C.; and (C) when a mixture comprised of 20% by weight of the brominated polyphenylene oxide and 80% by weight of triphenyl phosphate is heated at 280° C. for 20 minutes, the halide ion increase therein is not larger than 10 $\mu$mols per gram of the brominated polyphenylene oxide, is used as a flame retardant. When it is added to resin, the resin moldings are excellent in its flame retardancy, electric properties, physical properties, thermal stability and appearance (color hue), and they do not corrode molds.

5 Claims, No Drawings

BROMINATED POLYPHENYLENE OXIDE AND FLAME RETARDANT EMPLOYING THE BROMINATED POLYPHENYLENE OXIDE

BACKGROUND OF THE INVENTION

1. Field of the Invention

The present invention relates to brominated polyphenylene oxide which may be added to resin to give resin moldings being excellent in flame retardancy, electric properties, physical properties, thermal stability and appearance and which does not cause mold corrosion during molding, and to a flame retardant which employs the brominated polyphenylene oxide.

2. Description of the Related Art

For making resin such as glass fibers-reinforced polyamide resin resistant to flames, used are various condensed bromine compounds that bleed little. For example, JP-A-51-47044 discloses addition of a polystyrene bromide compound; JP-B-60-54347 discloses addition of a tetrabromobisphenol A-polycarbonate compound; JP-A-64-11158 discloses addition of a halogenoepoxy oligomer. On the other hand, JP-B-56-2100 discloses a brominated polyphenylene oxide compound. When compared with other types of bromine-based flame retardants, the compound is good in its thermal stability, heat resistance and mechanical properties, and therefore, it is specifically noticed as a flame retardant that has the ability to sustain the physical properties of even thin-walled resin products that are suitable to recent small-sized parts and members. However, the brominated polyphenylene oxide-based flame retardant that has heretofore been provided in the art often corrodes molds when the process temperature is high, and it may have some negative influence on the color tone and the thermal stability of the moldings containing it, and these problems with it began to surface.

To solve the problems, JP-A-61-118457 proposes combination with hydtotalcites; JP-A-63-150349 proposes combination with hydroxides of alkali metals of Group I of the Periodic Table or alkaline earth metals of Group II thereof; JP-B-3-153747 proposes combination with hydrotalcite, zeolite and a boron compound; and JP-A-7-252407 proposes combination with lactoaluminosilicates. However, their effects are all still unsatisfactory, and the problem of mold corrosion could not be basically solved as yet.

The invention has been made in consideration of the above, and its one object is to provide a brominated polyphenylene oxide which may be added to, for example, polyester resin or polyamide resin to give resin moldings being excellent in flame retardancy, electric properties, physical properties, thermal stability and appearance and which does not corrode molds during molding, and to provide a flame retardant that comprises it.

SUMMARY OF THE INVENTION

We, the present inventors have assiduously studied to solve the above-mentioned problems, and, as a result, have found that, when a specific brominated polyphenylene oxide compound which has good color aspect and contains few ionic substances and which gives few halide ions when melted under heat is added to resin such as polyamide resin, then the resulting resin moldings may satisfy all the necessary requirements of good appearance, flame retardancy, physical properties, electric properties and thermal stability, and, in addition, they do not cause a problem of mold corrosion in molding. On the basis of these findings, we have completed the invention.

Specifically, the invention provides a brominated polyphenylene oxide having a molecular skeleton obtained by condensing tribromophenols, which satisfies the following requirements to solve the problems mentioned above: (A) Its 20 wt. % solution in chloroform has an absorbance at 600 nm of not larger than 0.6; (B) when 50 ml of ion-exchanged water is added to its 1.00 g/30 ml solution in dioxane, the resulting solution has an electroconductivity of not larger than 10 $\mu$S/cm measured at 25° C.; and (C) when a mixture comprised of 20% by weight of the brominated polyphenylene oxide and 80% by weight of triphenyl phosphate is heated at 280° C. for 20 minutes, the halide ion increase therein is not larger than 10 $\mu$mols per gram of the brominated polyphenylene oxide.

The invention also provides a flame retardant which employs the above-mentioned brominated polyphenylene oxide.

DESCRIPTION OF THE PREFERRED EMBODIMENTS

The brominated polyphenylene oxide of the invention is obtained through condensation of tribromophenols. Its production method is not specifically defined. For example, a catalyst is added to a tribromophenol solution in an alkali metal phenolate, and the tribromophenol is condensed. The reaction solvent may be water or an aprotic organic solvent. Regarding the catalyst, J. Am. Chem. Soc., 82, 3632 (1960) reports iodine; JP-B-56-2100 reports potassium ferricyanide and benzoyl peroxide; and Japanese Patent 2,622,814 reports an organic halide that is positive in nitric acid or silver nitrate reaction, for example, benzoyl chloride or t-butyl chloride.

The terminal structure of the brominated polyphenylene oxide of the invention is not specifically defined. For example, its terminal structure may be any of OH group, carboxyl group, or those having ester bond or ether bond as proposed in JP-B-63-8977, or may be in the form of a metal salt. In addition, the terminal may have any two or more of such groups.

The brominated polyphenylene oxide of the invention shall satisfy all the requirements (A) to (C) mentioned above, for solving the problems with the related art technology. This is described in detail hereinunder.

First, when added to resin, the brominated polyphenylene oxide should not color the resin. For it, the absorbance at 600 nm of the 20 wt. % solution of the brominated polyphenylene oxide in chloroform is controlled not to be larger than 0.6. The coloration, if any, of a resin mixed with a flame retardant is related to the amount of the flame retardant added to the resin, and the amount of the flame retardant to be added to resin generally falls between 5 and 20% by weight in consideration of the balance of the economical viewpoint and the flame retardancy that the resin may have. So far as the absorbance of the brominated polyphenylene oxide satisfies the above-mentioned requirement, the resin discoloration with the polymer could be substantially within an acceptable range when the amount of the polymer added to the resin falls within that range. However, the range of the amount of the flame retardant that may be added to resin referred to herein should not define the amount of the flame retardant to be added to resin in the invention.

We, the present inventors have reached the findings that the thermal stability and the mold corrosion resistance of resin mixed with a flame retardant are influenced by the ionic substances that are in the flame retardant and in other additives and by the halide ions to be formed when brominated polyphenylene oxide is heated. Based on these findings, we have reached the above-mentioned requirements (B) and (C).

Specifically, the brominated polyphenylene oxide of the invention must be such that, when 1.00 g of the polymer is completely dissolved in 30 ml of dioxane and when 50 ml of ion-exchanged water is added to the resulting solution, then the electroconductivity of the polymer solution measured at 25° C. must be not larger than 10 $\mu$S/cm. In general, a flame retardant is added to resin along with other additives such as plasticizer, antioxidant, colorant, filler, fibrous reinforcing agent, UV stabilizer, and drooling inhibitor. If the extraction electroconductivity of the flame retardant is over 10 $\mu$S/cm and when a satisfactory amount of a bromine-containing flame retardant is added to resin so as to make the resin have the desired flame retardancy, then the resin mixture that contains the additives heretofore proposed in the art could not satisfy both the thermal stability and the mold corrosion resistance.

Brominated polyphenylene oxide compounds have the property of forming halide ions through condensation when heated. We, the present inventors have clarified that, even though a flame retardant itself does not contain an ionic substance, it may form halide ions when heated during mixing with resin, and, as a result, it may increase the ionic substances in the flame-retardant resin and the resin may be thereby colored or its thermal stability may be lowered, and the increased ionic substances will cause mold corrosion.

Accordingly, the brominated polyphenylene oxide of the invention shall be such that, when its 20 wt. % mixture with triphenyl phosphate is heated at 280° C. for 20 minutes, the halide ion increase therein is not more than 10 $\mu$mols per gram of the brominated polyphenylene oxide. In this, the triphenyl phosphate serves merely as a solvent in measuring the halide ion increase in the heated brominated polyphenylene oxide, and it does not react with the brominated polyphenylene oxide, and, in addition, it does not undergo any chemical change by itself under the test condition. For these reasons, it is conveniently selected in this test.

The brominated polyphenylene oxide-based flame retardant of the invention comprises the above-mentioned brominated polyphenylene oxide of the invention, and it may be the brominated polyphenylene oxide alone or may contain antimony trioxide or sodium antimonate that serves as a flame retardant aid, and/or various additives that may be added to resin.

The resin to which the brominated polyphenylene oxide of the invention is added as a flame retardant is not specifically defined. Preferred examples of the resin are polyester resin and polyamide resin. The moldings of the resin that contains the brominated polyphenylene oxide-based flame retardant of the invention are excellent in its flame retardancy, electric properties, physical properties, thermal stability and appearance (color hue), and the resin does not corrode the mold in which it is molded. Accordingly, the resin is especially favorable for the applications that require these characteristics, for example, for materials for the parts of various electronic appliances.

The brominated polyphenylene oxide of the invention is described concretely with reference to the following Examples and Comparative Examples, which, however, are for more detailed illustration of the invention and are not intended to restrict or limit the invention.

EXAMPLE 1

1) 300 g of tap water was fed into a one-liter separable flask equipped with a condenser, a thermometer and a stirrer, and 40 g (1 mol) of NaOH was dissolved in it. Further, 330 g (1 mol) of tribromophenol (by DSBG) was put into it and completely dissolved therein at a temperature not higher than 30° C. This was cooled to 10° C. or lower, and 10 g of an aqueous solution of 10% sodium bromate (1 g as bromine) was dropwise added thereto to start condensation. In this stage, the inner temperature rose up to 40° C., and this was further stirred for 3 hours at that temperature to finish the reaction. 300 ml of chloroform was added to it to completely dissolve the precipitate.

2) The reaction mixture in the flask was statically left as it was for separation, and the aqueous phase was taken out through the top of the flask. Then, 3 g of an aqueous solution of 80% hydrazine and 30 g of tap water were put into it and stirred for 30 minutes for discoloration.

3) 300 g of tap water was added to it, and, while the system was intermittently stirred, the pH of the aqueous phase was adjusted to about 4 with an aqueous solution of HBr added thereto.

4) The reaction mixture in the flask was statically left as it was for separation, and the aqueous phase was taken out through the top of the flask. This was again washed with water in the same manner as in the step 3). The chloroform phase alone was gradually put into one liter of acetone that was kept stirred, and a product was thereby precipitated.

5) The product was taken out through filtration, and dried under reduced pressure at 120° C. to obtain 240 g of brominated polyphenylene oxide. This is referred to as BrPPO-1.

EXAMPLE 2

BrPPO-1 obtained in Example 1 was mixed with BrPPO-5 obtained in Comparative Example 2 to be mentioned hereinunder, in a ratio of 8:2 by weight. This is BrPPO-2.

EXAMPLE 3

1) 300 g of tap water was fed into a one-liter separable flask equipped with a condenser, a thermometer and a stirrer, and 40 g (1 mol) of NaOH was dissolved in it. Further, 330 g (1 mol) of tribromophenol (by DSBG) was put into it and completely dissolved therein at a temperature not higher than 30° C. This was cooled to 10° C. or lower, and 10 g of an aqueous solution of 10% sodium bromate (1 g as bromine) was dropwise added thereto to start condensation. In this stage, the inner temperature rose up to 40° C., and this was further stirred for 3 hours at that temperature to finish the reaction. 300 ml of chloroform was added to it to completely dissolve the precipitate.

2) The reaction mixture in the flask was statically left as it was for separation, and the aqueous phase was taken out through the top of the flask. Then, 11.7 g (0.1 mols) of an aqueous solution of 48% KOH was added to it and stirred for 10 minutes, and thereafter 11.2 g (0.08 mols) of benzoic acid chloride was dropwise added thereto and further stirred for 30 minutes.

3) 300 ml of tap water was added to it and stirred. This was statically left as it was and the aqueous phase was taken out. Then, 3 g of an aqueous solution of 80% hydrazine and 30 g of tap water were put into it and stirred for 30 minutes for discoloration.

4) 300 g of tap water was added to it, and, while the system was intermittently stirred, the pH of the aqueous phase was adjusted to about 4 with an aqueous solution of HBr added thereto.

5) The reaction mixture in the flask was statically left as it was for separation, and the aqueous phase was taken out through the top of the flask. This was again washed with water in the same manner as in the step 3). The chloroform phase alone was gradually put into one liter of acetone that was kept stirred, and a product was thereby precipitated.

6) The product was taken out through filtration, and dried under reduced pressure at 120° C. to obtain 246 g of brominated polyphenylene oxide. This is referred to as BrPPO-3.

COMPARATIVE EXAMPLE 1

The same process as in Example 1 was repeated except that the step 2) was omitted herein, and 242 g of brominated polyphenylene oxide was obtained. This is BrPPO-4.

COMPARATIVE EXAMPLE 2

1) 200 g of tap water and 26.5 g (0.663 mols) of sodium hydroxide were put into a 500-ml separable flask equipped with a thermometer and a stirrer, and these were dissolved. To this was added 212.3 g (0.641 mols) of tribromophenol and dissolved at 30 to 40° C. Next, its pH was adjusted to 10.5 with hydrochloric acid added thereto, and then this was cooled to 20° C. At a temperature range of from 20 to 30° C., 10.6g of t-butyl chloride was added to it. In a few minutes after the addition, a product began to precipitate, and the inner temperature rose up to 40° C. At that temperature, this was kept stirred for 3 hours. An aqueous solution of 26% sodium hydroxide was added to it, and the pH of the resulting reaction mixture was adjusted to at least 12. With that, the product was taken out through filtration. 300 ml of isobutyl alcohol was added to the product, and 1.5 ml of an aqueous solution of 80% hydrazine was added thereto with stirring. This was kept at the reflux temperature of isobutyl alcohol for discoloration for 1 hour, and then cooled. The product was taken out through filtration and ground, and then water/methanol=100 ml/100 ml was added to it. While in slurry, this was heated at 50° C. for 1 hour for washing. After cooled, this was filtered. The washing operation was repeated twice. Thus washed and taken out through filtration, this was dried to obtain 144 g of a product, BrPPO-5.

COMPARATIVE EXAMPLE 3

1) 300 g of tap water was fed into a one-liter separable flask equipped with a condenser, a thermometer and a stirrer, and 40 g (1 mol) of NaOH was dissolved in it. Further, 0.5 g of sodium laurylsulfate and 330 g (1 mol) of tribromophenol (by DSBG) were put into it and completely dissolved therein at a temperature not higher than 30° C. At an inner temperature of 25° C., 10 g of benzoyl peroxide/xylene solution (Nipar BMT-K40 by Nippon Oils and Fats) was dropwise added to it over a period of 30 minutes. The inner temperature rose up to 45° C., and this was further stirred for 1 hour at that temperature to finish the reaction. 300 ml of chloroform was added to it to completely dissolve the precipitate.

2) The reaction mixture in the flask was statically left as it was for separation, and the aqueous phase was taken out through the top of the flask. Then, 3 g of an aqueous solution of 80% hydrazine and 30 g of tap water were put into it and stirred for 30 minutes for discoloration.

3) 300 g of tap water was added to it, and, while the system was intermittently stirred, the pH of the aqueous phase was adjusted to about 4 with an aqueous solution of HBr added thereto.

4) The reaction mixture in the flask was statically left as it was for separation, and the aqueous phase was taken out through the top of the flask. This was again washed with water in the same manner as in the step 3). The chloroform phase was gradually put into one liter of acetone that was kept stirred, and a crystal was thereby precipitated.

5) The product was taken out through filtration, and dried under reduced pressure at 120° C. to obtain 230 g of brominated polyphenylene oxide. This is referred to as BrPPO-6.

Brominated polyphenylene oxides thus obtained in the above were tested for the color hue, the extraction electroconductivity and the halide ion increase after heated, according to the methods mentioned below.

(1) Color Hue:

10.0 g of a sample is put into an Erlenmeyer flask with a ground stopper, and chloroform is put into it to amount 50.0 g, and this is completely dissolved. This is charged in a quartz cell having an optical path length of 1 cm, and its absorbance at 600 nm is measured with a spectrophotometer, U-1000 Model (by Hitachi). Chloroform alone is used as a control reference.

(2) Extraction Electroconductivity:

1.00 g of a sample is weighed in a 100-ml laboratory bottle made of polypropylene, and dioxane is added to it through a 30-ml whole pipette to completely dissolve it. While this is stirred with a magnet rotor, ion-exchanged water is gradually added thereto through a 50-ml whole pipette that was previously washed with ion-exchanged water. In this stage, a solid of brominated polyphenylene oxide deposits, but the operation is further continued. After the ion-exchanged water has been completely added thereto, this is kept in a thermostat at 25° C. for 1 hour or longer to thereby make its temperature constant. With that, its electroconductivity is measured by the use of a conductivity meter, CM-30S (by Toa Denpa Kogyo). A blank test with no sample is carried out in the same device, using the same reagent. The electroconductivity in the blank test should be 0.5 $\mu$S/cm. If it is over the value, the test is tried again, using a fresh ion-exchanged water.

(3) Halide Ion Increase After Heating:

1.00 g of a sample and 4.00 g of triphenyl phosphate are weighed and put into a test tube of 18 mm$\phi$×180 mm, and heated in an aluminium block bath controlled at 280° C. After heated for 5 minutes, the test tube is well shaken to make a uniform solution therein, and then, this is heated while kept statically. 20 minutes after the start of the heating, the test tube is taken out and left cooled at room temperature. All the reaction mixture in the test tube is transferred into a 100-ml beaker, in which it is washed with 60 ml of dioxane. Then, while it is stirred with a magnet rotor, about 10 ml of ion-exchanged water was gradually added to it. Three drops of an aqueous 10% nitric acid solution were added to it by the use of a syringe to thereby make the system acidic with nitric acid. Using an Ag electrode, this was subjected to precipitation titration with an aqueous N1100 silver nitrate solution to determine the halide ion concentration (CX1, $\mu$mol/g) in the sample. The triphenyl phosphate used herein has an acid value of smaller than 0.2 mg KOH/g and a halide ion content of smaller than 0.02 $\mu$mol/g.

The halide ion concentration (CX0, $\mu$mol/g) in the sample before heated is measured as follows: About 1 g of the sample is put into a 100-ml beaker and its weight is accurately measured. This is dissolved in 60 ml of dioxane, and then processed in the same manner as above to measure the halide ion concentration in the heated sample.

The halide ion increase after heating is represented by the halide ion concentration difference before and after heating ((CX1)–(CX0)).

The color hue, the extraction electroconductivity and the halide ion increase after heating of each of BrPPO-1 to BrPPO-6, thus measured in the manner as above, are given in Table 1.

(3) Heat Deflection Temperature:

According to JIS K6810, the heat deflection temperature (HDT) of each test piece is measured. The test piece size is as follows: The width is 12.7 mm, the height is 3.2 mm, and the length is 127 mm. The load applied to the test piece is 4.6 kgf/cm$^2$, and the temperature at which the test piece is deflected by 0.254 mm is read.

TABLE 1

|  | Example 1 | Example 2 | Example 3 | Comp. Ex. 1 | Comp. Ex. 2 | Comp. Ex. 3 |
|---|---|---|---|---|---|---|
| Brominated polyphenylene oxide (BrPPO-No.) | 1 | 2 | 3 | 4 | 5 | 6 |
| Color Hue (absorbance) | 0.25 | 0.26 | 0.56 | 0.82 | 0.30 | 0.35 |
| Extraction Electroconducitivity ($\mu$S/m) | 5 | 7 | 8 | 6 | 18 | 4 |
| Halide Ion Increase after heating ($\mu$mol/g) | 7 | 10 | 5 | 15 | 30 | 20 |

APPLICATION EXAMPLES 1 TO 6, COMPARATIVE APPLICATION EXAMPLES 1 to 6

As in Table 2 and Table 3, GF-reinforced PBT resin, Novadur 5010G-30 (by Mitsubishi Engineering Plastic) or GF-reinforced nylon-66 resin, Leona 54G33 (by Asahi Chemical Industry) was mixed with a predetermined amount of brominated polyphenylene oxide, antimony trioxide, polytetrafluoroethylene (Aflon CD076), antioxidant (Irganox HP-2215 or HP-2341) and thermal stabilizer (hydrotalcite, DHT-4A), and extruded out through a 20 mm$\phi$ double-screw extruder, and then cooled and pelletized. The resulting pellets were dried under reduced pressure at 80° C. for 24 hours, and then injection-molded into test pieces necessary for the tests mentioned below, and these were tested. The test pieces thus prepared were kept stored in a desiccator before used in the tests. The test results are given in Table 2 and Table 3.

(1) Resin Color Hue:

Regarding the color hue of the moldings, the YI value (yellow index) of each test piece is measured with a color meter, based on a white standard board. The test pieces are evaluated according to the following criteria:

A (good): YI<3.

B (average): YI=3 to 5.

C (bad): YI>5.

(2) Flame Retardancy:

According to the UL-94 vertical combustion method, the flame retardancy of each test piece is evaluated. The test piece size is as follows: The width is 12.7 mm, the length is 127 mm, and the thickness is 0.8 mm.

(4) Flexural Strength:

According to JISK7203, the flexural strength of each test piece is measured. The test pieces each have a width of 12.7 mm, a height of 3.2 mm and a length of 127 mm. The support-to-support distance is 68 mm, and the test speed is 2 mm/min. Thus tested, the flexural strength of each test piece is derived from the maximum load applied thereto.

(5) Tracking Resistance:

According to JIS C2134, the tracking resistance (CTI) of each test piece is measured. The test pieces each have a size of 50×50 mm and a thickness of 3.2 mm. Tabular pieces having a smooth surface are used as they are.

(6) Thermal Stability:

Tabular test pieces each having a smooth surface and having a size of 50×50 mm and a thickness of 3.2 mm are pressed under heat at a test temperature for 30 minutes, and their coloration ($\Delta$E) is measured with a calorimeter, based on the color of the test pieces before heating. These are evaluated according to the following criteria:

A (good): $\Delta$E<3.

B (average): $\Delta$E=3 to 5.

C (bad): $\Delta$E>5.

(7) Mold Corrosion Resistance:

2 g of flame-retardant resin pellets to be tested are put on a hardened steel sheet of SKD-11 having a clean surface, and covered with a glass cover. This is heated in an oven controlled at a test temperature, for 1 hour, and the steel surface is visually checked for rust (coloration). Thus tested, the samples are evaluated according to the following criteria:

C (bad): Rust (coloration) found.

A (good): No rust (coloration) found.

TABLE 2

|  | unit | Appl. Ex. 1 | Appl. Ex. 2 | Appl. Ex. 3 | Comp. Appl. Ex. 1 | Comp. Appl. Ex. 2 | Comp. Appl. Ex. 3 |
|---|---|---|---|---|---|---|---|
| GF-Reinforced PBT Resin | wt. pt. | 100.0 | 100.0 | 100.0 | 100.0 | 100.0 | 100.0 |
| Brominated polyphenylene oxide |  | BrPPO-1 | BrPPO-2 | BrPPO-3 | BrPPO-4 | BrPPO-5 | BrPPO-6 |
|  | wt. pt. | 14.0 | 14.0 | 14.0 | 14.0 | 14.0 | 14.0 |
| Antimony Trioxide | wt. pt. | 4.0 | 4.0 | 4.0 | 4.0 | 4.0 | 4.0 |
| PTFE (Aflon CD076) | wt. pt. | 0.3 | 0.3 | 0.3 | 0.3 | 0.3 | 0.3 |

TABLE 2-continued

|  | unit | Appl. Ex. 1 | Appl. Ex. 2 | Appl. Ex. 3 | Comp. Appl. Ex. 1 | Comp. Appl. Ex. 2 | Comp. Appl. Ex. 3 |
| --- | --- | --- | --- | --- | --- | --- | --- |
| Antioxidant (Irganox HP-2215) | wt. pt. | 0.2 | 0.2 | 0.2 | 0.2 | 0.2 | 0.2 |
| Thermal Stabilizer (Hydrotalcite DHT-4A) | wt. pt. | — | 0.2 | — | 0.2 | 0.2 | 0.2 |
| Resin Color Hue |  | A | A | A | C | C | B |
| Flame Retardancy (UL-94) |  | V-0 | V-0 | V-0 | V-0 | V-0 | V-0 |
| Heat Deflection Temperature (HDT) | ° C. | 208 | 207 | 207 | 207 | 208 | 206 |
| Flexural Strength | MPa | 230 | 230 | 230 | 220 | 225 | 235 |
| Tracking Resistance | V | 420 | 420 | 430 | 350 | 400 | 410 |
| Thermal Stability (280° C.) |  | A | A | A | C | C | B |
| Mold Corrosion Resistance (280° C.) |  | A | A | A | C | C | C |

TABLE 3

|  | unit | Appl. Ex. 4 | Appl. Ex. 5 | Appl. Ex. 6 | Comp. Appl. Ex. 4 | Comp. Appl. Ex. 5 | Comp. Appl. Ex. 6 |
| --- | --- | --- | --- | --- | --- | --- | --- |
| GF-Reinforced Nylon-66 Resin | wt. pt. | 100.0 | 100.0 | 100.0 | 100.0 | 100.0 | 100.0 |
| Brominated polyphenylene oxide |  | BrPPO-1 | BrPPO-2 | BrPPO-3 | BrPPO-4 | BrPPO-5 | BrPPO-6 |
|  | wt. pt. | 18.0 | 18.0 | 18.0 | 18.0 | 18.0 | 18.0 |
| Antimony Trioxide | wt. pt. | 6.0 | 6.0 | 6.0 | 6.0 | 6.0 | 6.0 |
| Antioxidant (Irganox HP-2341) | wt. pt. | 0.3 | 0.3 | 0.3 | 0.3 | 0.3 | 0.3 |
| Thermal Stabilizer (Hydrotalcite DHT-4A) | wt. pt. | 0.2 | 0.2 | 0.2 | 0.2 | 0.2 | 0.2 |
| Resin Color Hue |  | A | A | A | C | B | B |
| Flame Retardancy (UL-94) |  | V-0 | V-0 | V-0 | V-0 | V-0 | V-0 |
| Heat Deflection Temperature (HDT) | ° C. | 240 | 240 | 237 | 235 | 242 | 238 |
| Flexural Strength | MPa | 290 | 291 | 294 | 287 | 292 | 288 |
| Tracking Resistance | V | 350 | 350 | 350 | 310 | 260 | 290 |
| Thermal Stability (300° C.) |  | A | A | A | B | C | C |
| Mold Corrosion Resistance (300° C.) |  | A | A | A | C | C | C |

As seen from the test results given in Table 2 and Table 3, the resins containing BrPPO-4, of which the absorbance at 600 nm as its 20 wt. % solution in chloroform is over 0.6, were colored to a non-ignorable degree. BrPPO-4 will make it difficult to color the resin moldings containing it, and is therefore unfavorable to practical use.

On the other hand, the resins containing BrPPO-5, of which the extraction electroconductivity measured by adding 50 ml of ion-exchanged water to its 1.00 g/30 ml solution in dioxane, at 25° C., is over 10 µS/cm, are inferior in tracking resistance, thermal stability and mold corrosion resistance of their moldings.

Further, the resins containing any of BrPPO-4 to BrPPO-6, in which the halide ion increase when its 20 wt. % mixture with triphenyl phosphate is heated at 280° C. for 20 minutes is over 10 µmols per gram of the brominated polyphenylene oxide, are also inferior in color hue, thermal stability and mold corrosion resistance of their moldings.

As opposed to the above-mentioned results, the molding materials containing any of BrPPO-1 to BrPPO-3 of the invention are all excellent since their flame retardancy, electric properties and physical properties are all on a high level as well as the color hue, the thermal stability and the mold corrosion resistance of the resin moldings containing any of them are all significantly better than those in the Comparative Examples.

What is claimed is:

1. A purified brominated polyphenylene oxide having a molecular skeleton obtained by condensing tribromophenols, which satisfies the following requirements:

(A) Its 20 wt. % solution in chloroform has an absorbance at 600 nm of not larger than 0.6;

(B) When 50 ml of ion-exchanged water is added to its 1.00 g/30 ml solution in dioxane, the resulting solution has an electroconductivity of not larger than 10 µ/cm measured at 25° C.; and (C) When a mixture comprised of 20% by weight of the brominated polyphenylene oxide and 80% by weight of triphenyl phosphate is heated at 280° C. for 20 minutes, the halide ion increase therein is not larger than 10 µmols per gram of the brominated polyphenylene oxide;

wherein said purified brominated polyphenylene oxide satisfying said requirements is prepared by subjecting a solution of a crude brominated phenylene oxide obtained by condensing tribromophenols, to a decolorization treatment, subjecting the decolorized solution to a first liquid-liquid extraction with water, substantially completely separating the brominated polyphenylene oxide solution from the aqueous phase resulting from the extraction, subjecting the separated brominated polyphenyleneoxide solution to at least one additional liquid-liquid extraction with water, substantially completely separating the brominated phenylene oxide solution from the aqueous phase, and precipitating, filtering and drying a solid purified brominated polyphenylene oxide.

2. A flame retardant which comprises the brominated polyphenylene oxide of claim 1.

3. The purified brominated phenylene oxide of claim 1 wherein said decolorization treatment is carried out with hydrazine.

4. A method for preparing a purified brominated polyphenylene oxide having a molecular skeleton obtained by condensing tribromophenols, which satisfies the following requirements:

(A) Its 20 wt. % solution in chloroform has an absorbance at 600 nm of not larger than 0.6;

(B) When 50 ml of ion-exchanged water is added to its 1.00 g/30 ml solution in dioxane, the resulting solution has an electroconductivity of not larger than 10 $\mu$S/cm measured at 25° C.; and (C) When a mixture comprised of 20% by weight of the brominated polyphenylene oxide and 80% by weight of triphenyl phosphate is heated at 280° C. for 20 minutes, the halide ion increase therein is not larger than 10 $\mu$mols per gram of the brominated polyphenylene oxide;

said method comprising subjecting a crude solution of a brominated phenylene oxide obtained by condensing tribromophenols, to a decolorization treatment, subjecting the decolorized solution to a first liquid-liquid extraction with water, substantially completely separating the brominated polyphenylene oxide solution from the aqueous phase resulting from the extraction, subjecting the separated brominated polyphenylene oxide to at least one additional liquid-liquid extraction with water substantially completely separating the brominated phenylene oxide solution from the aqueous phase, and precipitating, filtering and drying a solid purified brominated polyphenylene oxide.

5. The method of claim 4, wherein said decolorization treatment is carried out with hydrazine.

* * * * *